US012038555B2

(12) United States Patent
Ji et al.

(10) Patent No.: US 12,038,555 B2
(45) Date of Patent: Jul. 16, 2024

(54) CATIONIC CONTACT LENS

(71) Applicant: CooperVision International Limited, Fareham (GB)

(72) Inventors: Yuan Ji, San Jose, CA (US); Yuwen Liu, Dublin, CA (US); Hyo Jeang Lee, Pleasanton, CA (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 0 days.

(21) Appl. No.: 18/206,627

(22) Filed: Jun. 7, 2023

(65) Prior Publication Data

US 2023/0408728 A1 Dec. 21, 2023

Related U.S. Application Data

(60) Provisional application No. 63/351,443, filed on Jun. 13, 2022.

(51) Int. Cl.
*G02B 1/04* (2006.01)
*G02C 7/04* (2006.01)

(52) U.S. Cl.
CPC .............. *G02B 1/043* (2013.01); *G02C 7/04* (2013.01)

(58) Field of Classification Search
CPC .......... G02B 1/043; G02C 7/04; G02C 7/049; G02C 7/021; B29D 11/00076; B29D 11/00096; C08L 33/10
(Continued)

(56) References Cited

U.S. PATENT DOCUMENTS 6,867,245 B2  3/2005 Iwata et al.
7,426,993 B2  9/2008 Coldrey et al.
(Continued)

FOREIGN PATENT DOCUMENTS

EP  3373047 A1  9/2018
GB  2603625 A   8/2022
(Continued)

OTHER PUBLICATIONS

International Search Report and Written Opinion issued in corresponding International Patent Application No. PCT/GB2023/051533 mailed Sep. 28, 2023 (14 pages).
(Continued)

*Primary Examiner* — William R Alexander
(74) *Attorney, Agent, or Firm* — Kilyk & Bowersox, P.L.L.C.

(57) ABSTRACT

A cationic contact lens is described as well as methods of manufacturing the same. The cationic contact lens includes a polymeric lens body that is the reaction product of a polymerizable composition that includes at least one siloxane, at least one nonionic hydrophilic monomer and at least one acyclic tertiary amine monomer. The cationic contact lens can be an unworn sterile silicone hydrogel contact lens. The contact lens is capable of substantially linear release of a releasable anionic agent and the at least one acyclic tertiary amine monomer facilitates uptake and/or sustained release of the releasable anionic agent by the polymeric lens body. The contact lens can be present in a sealed contact lens package. The sealed contact lens package can include at least a) a base member having a cavity; b) a contact lens packaging solution in the cavity; c) a unworn sterile contact lens immersed in the contact lens packaging solution in the cavity with the releasable anionic agent
(Continued)

present; and d) a cover that forms a liquid-tight seal with the base member.

21 Claims, 1 Drawing Sheet

(58) Field of Classification Search
 USPC .................................................. 351/159.02
 See application file for complete search history.

(56) References Cited

U.S. PATENT DOCUMENTS

| | | | |
|---|---|---|---|
| 8,231,218 | B2 | 7/2012 | Hong et al. |
| 8,388,995 | B1 | 3/2013 | Ali et al. |
| 8,658,747 | B2 | 2/2014 | Liu et al. |
| 8,865,789 | B2 | 10/2014 | Yao et al. |
| 2006/0177483 | A1* | 8/2006 | Byrne ..................... A61P 27/06 424/427 |
| 2008/0124378 | A1* | 5/2008 | Byrne ................. A61K 9/0051 424/429 |
| 2008/0152540 | A1 | 6/2008 | Schorzman et al. |
| 2012/0026458 | A1 | 2/2012 | Qiu et al. |
| 2012/0184696 | A1* | 7/2012 | Broad ..................... G02C 7/04 526/245 |
| 2019/0070804 | A1* | 3/2019 | Pruitt ................... A61K 9/0051 |
| 2020/0164112 | A1 | 5/2020 | Kato et al. |
| 2021/0063770 | A1 | 3/2021 | Mahadevan et al. |

FOREIGN PATENT DOCUMENTS

| | | |
|---|---|---|
| TW | 202117404 A | 5/2021 |
| WO | 2011045299 A9 | 4/2011 |

OTHER PUBLICATIONS

Combined Search and Examination Report issued in corresponding United Kingdom Patent Application No. GB2210004.4 dated Jan. 10, 2023 (7 pages).

Office Action issued in corresponding Taiwan Patent Application No. 112121580 mailed Mar. 4, 2024 (with English translation)(7 pages).

\* cited by examiner

CATIONIC CONTACT LENS

This application claims the benefit under 35 U.S.C. § 119(e) of prior U.S. Provisional Patent Application No. 63/351,443, filed Jun. 13, 2022, which is incorporated in its entirety by reference herein.

FIELD OF THE INVENTION

The field of the invention relates to contact lenses and sealed contact lens packages, and particularly, relates to contact lenses having cationic properties, and further relates to packages containing the contact lenses, and methods of manufacturing the contact lenses. The contact lenses of the present invention having the cationic properties can be considered cationic contact lenses. The contact lens provides the ability to controllably release one or more comfort agents or other beneficial agent in the form of releasable anionic agents.

BACKGROUND OF THE INVENTION

One of the major approaches to improve contact lens comfort is to introduce one or more comfort agents either in the lens materials or in the packaging solution. When the lens is placed on the eye, the comfort agents release to the ocular surface. However, it has always been a challenge to achieve controlled release of comfort agents during the course of contact lens wearing because the comfort agents are either trapped inside the lens materials with limited release or demonstrate a burst release instead of the desired controlled release or do not provide a release for the needed period of time (which can be 8 hours or more).

Thus, there is a need in the industry for contact lenses that provide a controlled release of comfort agent or an improvement in the controlled release of comfort agents. Further, it would also be desirable to provide such controlled release properties without significantly affecting other properties that are provided by contact lenses.

SUMMARY OF THE INVENTION

A feature of the present invention is to provide a contact lens that can release a comfort agent during lens wearing and avoid a burst release of the comfort agent.

An additional feature of the present invention is to provide an unworn, sterile contact lens that is a silicone hydrogel and having cationic properties.

A further feature of the present invention is to provide a silicone hydrogel contact lens that includes a comfort agent that is releasable when worn in the eye and has a controlled release for an extended period of time.

An additional feature of the present invention is to provide a silicone hydrogel contact lens that has the ability for a higher uptake and release of a comfort agent than conventional silicone hydrogel contact lenses.

An additional feature of the present invention is to provide a contact lens that can be loaded or recharged with a comfort agent by contacting the contact lens with an eye drop or a multi-purpose contact lens care solution that contains the comfort agent.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention, in part, relates to a silicone hydrogel contact lens having (i) a polymeric lens body that is the reaction product of a polymerizable composition that includes from 15 wt. % to 65 wt. % of at least one siloxane monomer, from 25 wt. % to 75 wt. % of at least one nonionic hydrophilic monomer, and from 0.1 wt. % to 15 wt. % of at least one acyclic tertiary amine monomer and (ii) at least one releasable anionic agent. The at least one acyclic tertiary amine monomer advantageously facilitates uptake and/or sustained release of the at least one releasable anionic agent by the polymeric lens body. Both 2-(dimethylamino)ethyl methacrylate (DMAEMA) and 3-(dimethylamino)propyl methacrylate (DMAPMA) have been found to be particularly suitable acyclic tertiary amine monomers.

The present invention further relates to a silicone hydrogel contact lens that includes a polymeric lens body that is the reaction product of a polymerizable composition comprising from 25 wt. % to 55 wt. % of a siloxane monomer(s), from 30 wt. % to 55 wt. % of a vinyl monomer selected from N-vinyl pyrrolidone, N-vinyl-N-methyl acetamide, or combinations thereof, from 0.1 wt. % to 10 wt. % of 2-(dimethylamino)ethyl methacrylate, and optionally from about 1 wt. % to about 20 wt. % of a hydrophilic monomer selected from N,N-dimethylacrylamide (DMA), 2-hydroxyethyl methacrylate (HEMA), ethoxyethyl methacrylamide (EOEMA), or ethylene glycol methyl ether methacrylate (EGMA), or any combination thereof, and optionally from about 1 wt. % to about 20 wt. % of a hydrophobic monomer selected from methyl methacrylate (MMA), isobornyl methacrylate (IBM), or 2-hydroxybutyl methacrylate (HOB) or any combination thereof.

The present invention further relates to a silicone hydrogel contact lens that includes a polymeric lens body that is the reaction product of a polymerizable composition comprising from 25 wt. % to 55 wt. % of a siloxane monomer(s), from 30 wt. % to 55 wt. % of a vinyl monomer selected from N-vinyl pyrrolidone, N-vinyl-N-methyl acetamide, or combinations thereof, from 0.5 wt. % to 3 wt. % of 3-(dimethylamino)propyl methacrylate, and optionally from about 1 wt. % to about 20 wt. % of a hydrophilic monomer selected from N,N-dimethylacrylamide (DMA), 2-hydroxyethyl methacrylate (HEMA), ethoxyethyl methacrylamide (EOEMA), or ethylene glycol methyl ether methacrylate (EGMA), or any combination thereof, and optionally from about 1 wt. % to about 20 wt. % of a hydrophobic monomer selected from methyl methacrylate (MMA), isobornyl methacrylate (IBM), or 2-hydroxybutyl methacrylate (HOB) or any combination thereof. Contact lenses that are the reaction product of such compositions have been found to have a particularly good dimensional stability.

In addition, the present invention relates to an unworn sterile silicone hydrogel contact lens that includes a polymeric lens body that is the reaction product of a polymerizable composition comprising from 15 wt. % to 65 wt. % of at least one siloxane monomer, from 25 wt. % to 75 wt. % of at least one nonionic hydrophilic monomer, and from 0.1 wt. % to 15 wt. % of at least one acyclic tertiary amine monomer. The unworn sterile silicone hydrogel contact lens is advantageously capable of substantially linear release of a releasable anionic agent at a release rate of at least 6 µg/hr for at least 8 hours. The at least one acyclic tertiary amine monomer advantageously facilitates uptake and/or sustained release of the releasable anionic agent by the polymeric lens body.

Furthermore, the present invention relates to a method of making the silicone hydrogel contact lens of the present invention. The method includes the steps of a) polymerizing a polymerizable composition (as described herein) in a contact lens mold to obtain a polymeric lens body, b) removing the polymeric lens body from said contact lens mold, c) extracting the polymeric lens body in an organic solvent, d) hydrating the polymeric lens body in a hydration liquid to obtain the silicone hydrogel contact lens, e) sealing said hydrated silicone hydrogel contact lens with packaging solution in a package, and f) autoclaving said package, wherein at least one of the organic solvent, the hydration liquid, or the packaging solution contains at least one releasable anionic agent.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

DETAILED DESCRIPTION OF THE PRESENT INVENTION

Figure 1A:
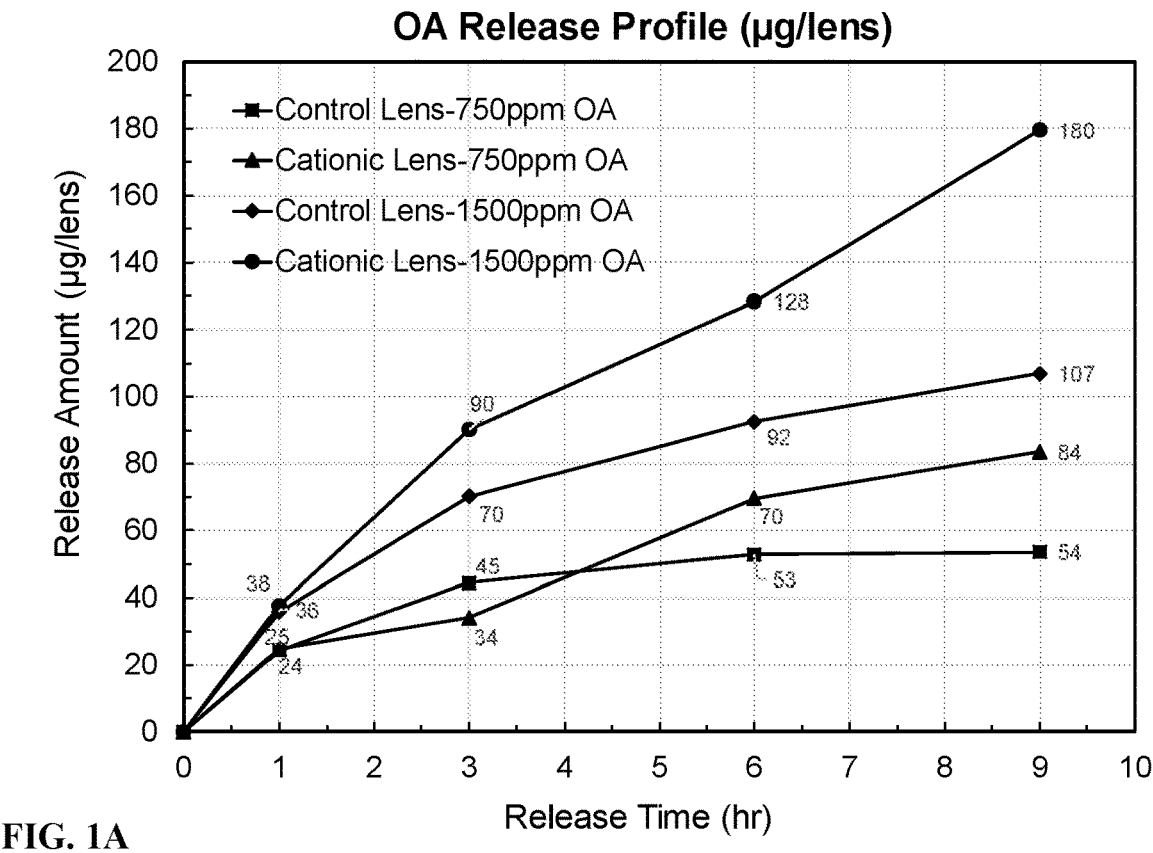
FIG. 1A plots the amount of an anionic agent released from cationic silicone hydrogel contact lenses compared to a control lens.

Contact lenses having cationic properties and their method of manufacture are described herein. The contact lens or lenses having the cationic property or properties can be referred to, herein, as a cationic contact lens. A sealed contact lens package that includes the contact lens is also described herein.

In the present invention, the cationic contact lens preferably provides a controlled release of one or more anionic agent during the course of contact lens wearing, such as an anionic comfort agent or other beneficial anionic agent, that can dissociate from the polymeric lens material during wearing under physiological conditions.

With respect to the contact lens in the present invention, the contact lens is an unworn sterile hydrogel contact lens. In other words, the contact lens is unused and is new.

The hydrogel contact lens is a reaction product of a polymerizable composition that includes one acyclic tertiary amine monomer.

As an example, the hydrogel contact lens is a reaction product of a polymerizable composition for a non-silicone hydrogel that includes at least one acyclic tertiary amine monomer. Non-silicone hydrogel contact lenses are typically formed from polymerization of one or more hydrophilic monomers such as 2-hydroxyethyl methacrylate (HEMA) or vinyl alcohol, optionally in combination with other monomers, and contains no siloxane (i.e. a molecule comprising at least one Si—O group).

As an example, the silicone hydrogel contact lens is a reaction product of a polymerizable composition that includes at least one siloxane monomer, at least one nonionic hydrophilic monomer, and at least one acyclic tertiary amine monomer.

As a further example, the silicone hydrogel contact lens is a reaction product of a polymerizable composition that includes at least one siloxane monomer, at least one nonionic hydrophilic monomer, at least one acyclic tertiary amine monomer, and at least one hydrophobic monomer.

In general, a "monomer" can include or refer to a molecule comprising a polymerizable carbon-carbon double bond (i.e. a polymerizable group) capable of reacting with other polymerizable group-containing molecules that are the same or different, to form a polymer or copolymer. The term monomer encompasses polymerizable pre-polymers and macromers, there being no size constraint of the monomer unless indicated otherwise. The monomer may comprise a single polymerizable carbon-carbon double bond, or more than one polymerizable group, and thus have cross-linking functionality.

Referring to the reaction product of the polymerizable composition, at least one siloxane monomer can be one siloxane monomer or two or three or more siloxane monomers.

As used herein, the term "siloxane monomer" is a molecule that contains at least one Si—O group and at least one polymerizable group. Siloxane monomers used in contact lens compositions are well-known in the art (see, e.g., U.S. Pat. Nos. 8,658,747 and 6,867,245). (All patents and publications mentioned here and throughout are incorporated in their entirety by reference.)

In some examples, the polymerizable composition comprises a total amount of siloxane monomer of at least 10 wt. %, 15 wt. %, 20 wt. %, 25 wt. % or 30 wt. % up to about 40 wt. %, 45 wt. %, 50 wt. %, 55 wt. %, 60 wt. %, or 65 wt. %. For instance, the at least one siloxane monomer can be present in an amount of from 15 wt. % to about 65 wt. %, based on the weight of the polymerizable composition.

In general, unless specified otherwise, as used herein, a given weight percentage (wt. %) of a component of the polymerizable composition is relative to the total weight of all polymerizable ingredients (and any optional polymers or other components that may be present) in the polymerizable composition. The weight of the polymerizable composition contributed by components, such as diluents, that do not incorporate into the final contact lens product are not included in the wt. % calculation.

Exemplary siloxane monomers are those used in the following FDA-approved silicone hydrogel materials: asmofilcon A, balafilcon A, comfilcon A, delefilcon A, enfilcon A, fanfilcon A, galyfilcon A, kalifilcon A, lotrafilcon A, lotrafilcon B, narafilcon A, narafilcon B, olifilcon A, riofilcon A, samfilcon A, senofilcon A, senofilcon B, senofilcon C, somofilcon A, and stenfilcon A.

The nonionic hydrophilic monomer can be present in the reaction product of the polymerizable composition in amounts of at least 10 wt. %, 15 wt. %, 20 wt. %, 25 wt. % or 30 wt. % up to about 40 wt. %, 45 wt. %, 50 wt. %, 55 wt. %, 60 wt. %, 65 wt. %, 70 wt. %, or 75 wt. % based on the weight of the polymerizable composition. For instance, the at least one nonionic hydrophilic monomer can be present in an amount of from 25 wt. % to about 70 wt. %, based on the weight of the polymerizable composition.

With respect to the nonionic hydrophilic monomer, as used herein, the at least one nonionic hydrophilic monomer can be understood to comprise a single hydrophilic monomer, or to comprise a hydrophilic monomer component composed of two or more hydrophilic monomers, such as two, three, or four or more.

The hydrophilicity or hydrophobicity of a monomer can be determined using conventional techniques, such as, for example, based on the monomer's aqueous solubility. For purposes of the present disclosure, a hydrophilic monomer is a monomer that is visibly soluble in an aqueous solution at room temperature (e.g. about 20-25 degrees C.). For example, a hydrophilic monomer can be understood to be any monomer for which 50 grams of the monomer are visibly fully soluble in 1 liter of water at 20° C. (i.e., ≥5% soluble in water) as determined using a standard shake flask method as known to persons of ordinary skill in the art. A hydrophobic monomer, as used herein, is a monomer that is visibly insoluble in an aqueous solution at room temperature, such that separate, visually identifiable phases are present in the aqueous solution, or such that the aqueous solution appears cloudy and separates into two distinct phases over time after sitting at room temperature. For example, a hydrophobic monomer can be understood to be any monomer for which 50 grams of the monomer are not visibly fully soluble in 1 liter of water at 20° C.

Non-silicon nonionic hydrophilic monomers which can be used as the hydrophilic monomer or the hydrophilic monomer component in the polymerizable compositions disclosed herein include, for example, acrylamide-containing monomers, or acrylate-containing monomers, or acrylic acid-containing monomers, or methacrylate-containing monomers, or methacrylic acid-containing monomers, or vinyl-containing monomer or any combination thereof. It is understood that the hydrophilic monomer or hydrophilic monomer component is a non-silicon monomer.

Examples of the nonionic hydrophilic monomer include, but are not limited to, N,N-dimethylacrylamide (DMA), or 2-hydroxyethyl acrylate, or 2-hydroxyethyl methacrylate (HEMA), or ethoxyethyl methacrylamide (EOEMA), or 2-hydroxypropyl methacrylate, or 2-hydroxybutyl methacrylate (HOB), or 2-hydroxybutyl acrylate, or 4-hydroxybutyl acrylate glycerol methacrylate, or 2-hydroxyethyl methacrylamide, or polyethyleneglycol monomethacrylate, or methacrylic acid, or acrylic acid, ethylene glycol methyl ether methacrylate (EGMA), or any combinations thereof.

The nonionic hydrophilic monomer can be at least one hydrophilic vinyl monomer. As used-herein, a "hydrophilic vinyl monomer" is any siloxane-free (i.e. contains no Si—O groups) hydrophilic monomer having a polymerizable carbon-carbon double bond (i.e., a vinyl group) present in its molecular structure that is not part of an acryl group, where the carbon-carbon double bond of the vinyl group is less reactive than the carbon-carbon double bond present in a polymerizable methacrylate group under free radical polymerization. As used herein, the term "acryl group" refers to the polymerizable group present in acrylate, methacrylates, acrylamides, etc. Thus, while carbon-carbon double bonds are present in acrylate and methacrylate groups, as used herein, such polymerizable groups are not considered to be vinyl groups.

Examples of hydrophilic vinyl-containing monomers which can be provided in the polymerizable compositions include, without limitation, N-vinyl formamide, or N-vinyl acetamide, or N-vinyl-N-ethyl acetamide, or N-vinyl isopropylamide, or N-vinyl-N-methyl acetamide (VMA), or N-vinyl pyrrolidone (NVP), or N-vinyl caprolactam, or N-vinyl-N-ethyl formamide, or N-vinyl formamide, or N-2-hydroxyethyl vinyl carbamate, or N-carboxy-β-alanine N-vinyl ester, 1,4-butanediol vinyl ether (BVE), or ethylene glycol vinyl ether (EGVE), or diethylene glycol vinyl ether (DEGVE), or any combination thereof. In one example, the hydrophilic monomer or hydrophilic monomer component comprises VMA, NVP, or both VMA and NVP.

In one example, the polymerizable composition comprises at least 10 wt. %, 15 wt. %, 20 wt. %, or 25 wt. % up to about 45 wt. %, 50 wt. %, 55 wt. %, 60 wt. %, 65 wt. %, or 75 wt. % of a hydrophilic vinyl monomer. As used herein, a given weight percentage of a particular class of component (e.g., hydrophilic vinyl monomer, siloxane monomer, or the like) in the polymerizable composition equals the sum of the wt. % of each ingredient in the composition that falls within the class. Thus, for example, a polymerizable composition that comprises 5 wt. % BVE and 25 wt. % NVP and no other hydrophilic vinyl monomer, is said to comprise 30 wt. % hydrophilic vinyl monomer. In one example, the hydrophilic vinyl monomer is an N-vinyl amide monomer. Exemplary hydrophilic N-vinyl amide monomers are VMA and NVP. In a specific example, the polymerizable composition comprises at least 25 wt. % (e.g., from 25 wt. % to 55 wt. %) of at least one vinyl amide monomer. In a further specific example, the polymerizable composition comprises from about 25 wt. % up to about 75 wt. % (e.g., from 25 wt. % to 55 wt. %) of VMA or NVP, or a combination thereof.

The acyclic tertiary amine monomer can be present in the reaction product of the polymerizable composition in amounts of from 0.1 wt. % to about 15 wt. %, such as from 1 wt. % to 14 wt. %, from 1 wt. % to 12 wt. %, from 1 wt. % to 10 wt. %, from 1 wt. % to 7 wt. %, from 1 wt. % to 5 wt. %, from 5 wt. % to 15 wt. %, from 6 wt. % to 15 wt. %, from 8 wt. % to 15 wt. %, based on the total weight of the polymerizable composition.

The acyclic tertiary amine monomer can be considered a cationic monomer.

With respect to the acyclic tertiary amine monomer, as used herein, the at least one acyclic tertiary amine monomer can be understood to comprise a single acyclic tertiary amine monomer, or to comprise an acyclic tertiary amine monomer component composed of two or more acyclic tertiary amine monomers, such as two, three, or four or more.

The acyclic tertiary amine monomer is a monomer in which the nitrogen of the tertiary amine group is not part of a ring structure, though the monomer may contain a ring structure (e.g. N-(2-Aminoethyl) aminomethyl styrene). The term "tertiary amine group" is understood to refer to a nitrogen atom directly bonded to three carbon atoms provided none of the carbon atoms is part of a carbonyl group.

Exemplary acyclic tertiary amine monomers include, but are not limited to, 2-(dimethylamino)ethyl acrylate, or 2-(diethylamino)ethyl acrylate, or 3-(dimethylamino)propyl acrylate, or 3-(diethylamino)propyl acrylate, or 2-(dimethylamino)ethyl methacrylate, or 2-(diethylamino)ethyl methacrylate, or 3-(dimethylamino)propyl methacrylate, or 3-(diethylamino)propyl methacrylate, or N-(2-(dimethylamino) ethyl) acrylamide, or N-(2-(diethylamino)ethyl) acrylamide, or N-(3-(dimethylamino)propyl) acrylamide, or N-(3-(diethylamino)propyl) acrylamide, or N-(2-(dimethylamino)ethyl) methacrylamide, or N-(2-(diethylamino)ethyl) methacrylamide, or N-(3-(dimethylamino)propyl) methacrylamide, or N-(3-(diethylamino)propyl) methacrylamide, or 3-(diethylamino)propyl vinyl ether, or 3-(dimethylamino)propyl vinyl ether or any combinations thereof.

A more specific example of the acyclic tertiary amine monomer is 2-(diethylamino)ethyl methacrylate, which can be present in an amount of from 0.1 wt. % to 15 wt. % or from 1 wt. % to 10 wt. % in the polymerizable composition (based on the total weight of the polymerizable composition).

Another specific example of the acyclic tertiary amine monomer is 3-(dimethylamino)propyl methacrylate, which can be present in an amount of from 0.5 wt. % to 3 wt. % or from 1 wt. % to 2.5 wt. % in the polymerizable composition (based on the total weight of the polymerizable composition). Compositions comprising 3-(dimethylamino) propyl methacrylate have been found to provide contact lenses having particularly good dimensional stability.

The contact lenses described herein are considered "dimensionally-stable" if they are from a batch (i.e. lot) of contact lenses that exhibit an average dimensional stability variance of +3.0% (i.e. less than or equal to plus or minus three percent) as determined by a shelf-life testing method in which the chord diameters of twenty lenses from a single lot are measured, and the average "original" diameter is obtained. Concurrently, twenty unopened packages of lenses from the same lot are placed in an incubator set at 55° C. The lenses are kept at this elevated temperature storage condition for three months to approximate a two-year shelf life at 25° C. At the end of three months the packaged lenses are brought to room temperature, removed from their packaging, and measured to obtain the average "final" diameter. The dimensional stability variance is calculated by the equation: (Diameter$_{Final}$–Diameter$_{Original}$/Diameter$_{Original}$)×100. In some examples, the dimensional stability variance is ≤+2.5% or ≤+2.0% or ≤+1.5% or ≤1.0%.

In general, the acyclic tertiary amine monomer (and once part of the polymeric lens body) will form charged sites in lower pH and/or lower ionic strength solutions, e.g., pH of below 8.0 or below 7 or in acidic conditions, such as a pH of 6 or lower (e.g., pH of from 4 to 6). In these conditions, the acyclic tertiary amine groups are protonated forming positively charged sites in the lens material. As explained further, these positively charged sites can form ionic complexes with the negatively charged comfort agent(s) or other releasable anionic agent(s).

Advantageously, one or more acyclic tertiary amine monomer is included in the polymerizable composition to provide a polymeric lens body with a cationic content of from about 1.0%, or 2.0% or 3.0% up to about 5.0%, 7.0%, or 10.0%. As used "cationic content" is a value determined by Formula I:

$$\Sigma(a_{n1} \times b_{n1}/c_{n1}) \times 157 = \% \text{ cationic content} \quad (I)$$

where $a_{n1}$ is the weight percentage, as defined below, of cationic monomer n1 used in the monomer mixture, $b_{n1}$ is the number of tertiary amine groups on monomer n1, and $c_{n1}$ is the molecular weight of the tertiary amine-containing monomer n1. If more than one tertiary amine-containing monomer is used in the polymerizable composition, the % tertiary amine content of the resulting polymeric lens body is the sum of the % ionic content provided by each tertiary amine-containing monomer (i.e. n1, n2, etc.). The weight percentage of the tertiary amine containing monomer n1 in the polymerizable composition is relative to the weight of all components of the monomer mixture that incorporate into the hydrogel. In other words, ingredients of the monomer mixture that do not incorporate into the final hydrogel product, such as diluents that are removed from the hydrogel during the manufacturing process, are not included in the weight percent determination. Formula I adjusts for differences in molecular weight and charge relative to 2-(dimethylamino)ethyl methacrylate, an exemplary tertiary amine-containing monomer, which has a molecular weight of 157 and one tertiary amine group.

As an option, one or more hydrophobic monomers can be present as part of the polymerizable composition.

Examples of suitable hydrophobic monomers include, but are not limited to, one or more non-silicon containing hydrophobic monomers. Examples of suitable hydrophobic monomers include methyl acrylate, or ethyl acrylate, or propyl acrylate, or isopropyl acrylate, or cyclohexyl acrylate, or 2-ethylhexyl acrylate, or methyl methacrylate (MMA), or ethyl methacrylate, or propylmethacrylate, or butyl acrylate, or 2-hydroxybutyl methacrylate, or vinyl acetate, or vinyl propionate, or vinyl butyrate, or vinyl valerate, styrene, or chloroprene, or vinyl chloride, or vinylidene chloride, or acrylonitrile, or 1-butene, or butadiene, or methacrylonitrile, or vinyltoluene, or vinyl ethyl ether, or perfluorohexylethylthiocarbonylaminoethyl methacrylate, or isobornyl methacrylate (IBM), or trifluoroethyl methacrylate, or hexafluoroisopropyl methacrylate, or tetrafluoropropyl methacrylate, or hexafluorobutyl methacrylate, or any combinations thereof.

The hydrophobic monomer, if used, can be present in the reaction product of the polymerizable composition in amounts of from 1 wt. % to about 30 wt. %, such as from 1 wt. % to 25 wt. %, from 1 wt. % to 20 wt. %, from 1 wt. % to 15 wt. %, from 2 wt. % to 20 wt. %, from 3 wt. % to 20 wt. %, from 5 wt. % to 20 wt. %, from 5 wt. % to 15 wt. %, from 1 wt. % to 10 wt. %, based on the total weight of the polymerizable composition.

In addition, or as an alternative to a hydrophilic monomer, the polymerizable composition may comprise a non-polymerizable hydrophilic polymer, which results in a polymeric lens body comprising an interpenetrating polymer network (IPN) with the non-polymerizable hydrophilic polymer interpenetrating the silicone hydrogel polymer matrix. In this example, the non-polymerizable hydrophilic polymer is referred to as an IPN polymer, which acts as an internal wetting agent in the contact lens. In contrast, polymer chains within the silicone hydrogel network that form by polymerization of monomers present in the polymerizable composition are not considered to be IPN polymers. The IPN polymer may be a high molecular weight hydrophilic polymer, for example from about 50,000 to about 500,000 Daltons. In a specific example, the IPN polymer is polyvinylpyrrolidone (PVP). In other examples, the polymerizable composition is free or substantially free of polyvinyl pyrrolidone or other IPN polymer.

The polymerizable composition may additionally comprise at least one cross-linking agent. As used herein, a "cross-linking agent" is a molecule having at least two polymerizable groups. Thus, a cross-linking agent can react with functional groups on two or more polymer chains so as to bridge one polymer to another. A variety of cross-linking agents suitable for use in silicone hydrogel polymerizable compositions are known in the field (see, e.g., U.S. Pat. No. 8,231,218, incorporated herein by reference). Examples of suitable cross-linking agents include, without limitation, lower alkylene glycol di(meth)acrylates such as triethylene glycol dimethacrylate and diethylene glycol dimethacrylate; poly(lower alkylene) glycol di(meth)acrylates; lower alkylene di(meth)acrylates; allyl methacrylate, divinyl ethers such as triethylene glycol divinyl ether, diethylene glycol divinyl ether, 1,4-butanediol divinyl ether and 1,4- cyclohexanedimethanol divinyl ether; divinyl sulfone; di- and trivinylbenzene; trimethylolpropane tri(meth)acrylate; pentaerythritol tetra(meth)acrylate; bisphenol A di(meth) acrylate; methylenebis(meth)acrylamide; triallyl phthalate; 1,3-Bis(3-methacryloxypropyl)tetramethyldisiloxane; diallyl phthalate; triallyl isocyanurate and combinations thereof.

As will be appreciated by those skilled in the art, the polymerizable composition may comprise additional polymerizable or non-polymerizable ingredients conventionally used in contact lens formulations such as one or more of a polymerization initiator, an oxygen scavenger, a chain transfer agent, a diluent, or the like. In some examples, the polymerizable composition may include an organic diluent in an amount to prevent or minimize phase separation between the hydrophilic and hydrophobic components of the polymerizable composition, so that an optically clear lens is obtained. Diluents commonly used in contact lens formulations include hexanol, ethanol, and/or other primary, secondary or tertiary alcohols. In other examples, the polymerizable composition is free or substantially free (e.g., less than 500 ppm) of an organic diluent. In such examples, the use of siloxane monomers containing hydrophilic moieties such as polyethylene oxide groups, pendant hydroxyl groups, or other hydrophilic groups, may make it unnecessary to include a diluent in the polymerizable composition. Non-limiting examples of these and additional ingredients that may be included in the polymerizable composition are provided in U.S. Pat. No. 8,231,218.

A specific example of a silicone hydrogel contact lens of the present invention is one that is based on a polymerizable composition comprising from 25 wt. % to 55 wt. % of a siloxane monomer(s), from 30 wt. % to 55 wt. % of a vinyl monomer selected from NVP, VMA, or combinations thereof, and optionally from about 1 wt. % to about 20 wt. % of a hydrophilic monomer selected from N,N-dimethylacrylamide (DMA), 2-hydroxyethyl methacrylate (HEMA), ethoxyethyl methacrylamide (EOEMA), or ethylene glycol methyl ether methacrylate (EGMA), or any combination thereof, and optionally from about 1 wt. % to about 20 wt. % of a hydrophobic monomer selected from methyl methacrylate (MMA), isobornyl methacrylate (IBM), or 2-hydroxybutyl methacrylate (HOB) or any combination thereof. Silicone hydrogel materials made from this specific embodiment of polymerizable composition include stenfilcon A, comfilcon A, somofilcon A, fanfilcon A, and enfilcon A. In a further example, the above-described polymerizable composition comprises the siloxanes of stenfilcon A, specifically a first siloxane having the structure represented by Formula (I),

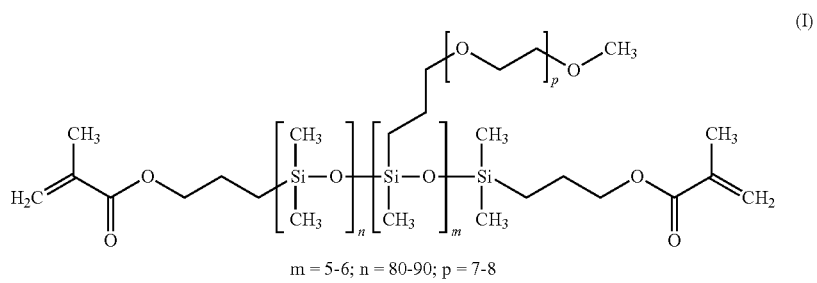

$m = 5\text{-}6; n = 80\text{-}90; p = 7\text{-}8$ and a second siloxane having the structure represented by Formula (II),

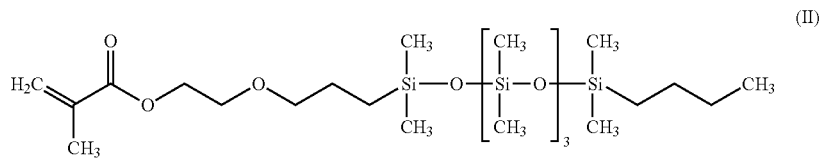

The above base polymerizable composition is further modified to additionally comprise from 0.1 wt. % to 15 wt. % of at least one acyclic tertiary amine, such as, for example, 1 wt. % to 10 wt. % of 2-(dimethylamino)ethyl methacrylate or 0.5 wt. % to 3 wt. % of 3-(dimethylamino)propyl methacrylate and cured to provide a cationic polymeric lens body.

As a part of the present invention, the contact lens is a silicone hydrogel contact lens comprising a polymeric lens body and at least one releasable anionic agent adhered to the polymeric lens body. The anionic agent may be adhered to the polymeric lens body by cationic and/or hydrophobic interaction, and/or may be physically entrapped by the polymer network of the polymeric lens body. The releasable anionic agent can be one or more releasable anionic agents (e.g., one, two, or more).

As an option, the releasable anionic agent is capable of blocking TRPV1 receptors and/or is capable of interacting with PPARa receptors, such as on the cornea.

Examples of the releasable anionic agent include, but are not limited to, at least one acid. In a specific example the anionic agent comprises a single carboxylic acid group. In another example, the anionic agent comprises two or more carboxylic acid groups. In one example, the anionic agent is a small molecule (i.e. having a molecular weight of less than about 900 daltons). In some examples the releasable anionic agent, as an option, is not a polymer. As an option, the releasable anionic agent is not a polymer of a disaccharide.

Examples of the releasable anionic agent include, but are not limited to, at least one fatty acid. A more specific example of the releasable anionic agent is oleic acid.

When the releasable anionic agent is complexed through ionic interaction with the polymeric lens body (for instance, due to low pH conditions and/or low ionic strength conditions), such as below about 7 pH or below about 6 pH), at that state, the releasable anionic agent itself is an anionic agent or material that is complexed through ionic interaction with cationic portions or molecules that form part of the polymeric lens material. As an example, the releasable anionic agent, once deprotonated, can form a complex with at least some of the protonated portions or molecules in the polymeric lens body, such as the protonated tertiary amine groups that are present in the polymeric lens body. The releasable anionic agent that is complexed through ionic interaction with the polymeric lens body is released from the polymeric lens body, such as by dissociating under physiological conditions through ionic interaction with the counterions in eye tear. The released anionic agent at that point, generally becomes a salt or ester (e.g., a salt of at least one acid, such as oleic acid or an oleate).

The amount of releasable anionic agent adhered to the polymeric lens body can be an amount of at least 25 µg, such as from about 25 µg to 1000 µg or more, or from 25 µg to 700 µg, or from 25 µg to 650 µg, or from 25 µg to 600 µg, or from 25 µg to 550 µg, or from 25 µg to 500 µg, or from 25 µg to 450 µg, or from 25 µg to 400 µg, or from 25 µg to 350 µg, or from 25 µg to 300 µg, or from 25 µg to 250 µg, or from 50 µg to 750 µg, or from 75 µg to 750 µg, or from 100 µg to 750 µg, or from 125 µg to 700 µg, or from 150 µg to 700 µg, or from 175 µg to 700 µg, or from 200 µg to 700 µg, and the like. In one example, the releasable anionic agent is oleic acid, which is adhered to the polymeric lens body in an amount of from about 25 µg to about 500 µg, or from about 100 µg to about 300 µg. As used herein, the phrase "amount of releasable anionic agent adhered to the polymeric lens body" refers to the total amount of a releasable anionic agent that can be extracted from the contact lens by an appropriate extraction method, such as the isopropyl alcohol (IPA) extraction method described in Example 1 below.

As an option, the releasable anionic agent can be uniformly distributed throughout the polymeric lens body by way of the ionic interaction described herein. As an option, the releasable anionic agent can be non-uniformly distributed. For instance, the releasable anionic agent can be present in a higher amount on a side of the contact lens or on both sides of the contact lens (i.e., the posterior and anterior sides) as compared to the interior portions of the contact lens (the area located between the posterior and anterior sides).

The releasable anionic agent present within the silicone hydrogel contact lens is not covalently attached to the polymeric lens body.

In lieu of or in addition to the ionic interaction described herein between the polymeric lens body and the releasable anionic agent, the releasable anionic agent, as an option, can be considered as embedded, trapped, dispersed, absorbed, and/or located within the contact lens. As mentioned, the releasable anionic agent is preferably present within and/or on the surface of the contact lens due to the releasable anionic agent forming a complex with the lens material or a portion of the lens material, which would be considered an ionic interaction.

A further example of a contact lens of the present invention is an unworn sterile silicone hydrogel contact lens that includes a polymeric lens body that is the reaction product of a polymerizable composition comprising from 15 wt. % to 65 wt. % of at least one siloxane monomer, from 25 wt. % to 75 wt. % of at least one nonionic hydrophilic monomer, and from 0.1 wt. % to 15 wt. % of at least one acyclic tertiary amine monomer. The unworn sterile silicone hydrogel contact lens is capable of releasing a releasable anionic agent at a release rate of at least 6 µg/hr for at least 8 hours. References herein to the amounts of, or duration of release of, an anionic agent from a contact lens are intended to mean the amounts and/or duration of release from a contact lens when tested in the in vitro release assay described in Example 2. The at least one acyclic tertiary amine monomer facilitates uptake and/or sustained release of the releasable anionic agent by the polymeric lens body.

With respect to the at least one acyclic tertiary amine monomer facilitating uptake and/or sustained release of the at least one releasable anionic agent by the polymeric lens body, this means if one compared a 'control lens', that is a silicone hydrogel contact lens comprising a polymeric lens body formed from a polymerizable composition with no acyclic tertiary amine monomer present (but otherwise the same polymerizable composition but in lieu of an amount of acyclic tertiary amine monomer, this amount is replaced with a hydrophobic monomer such as MMA), with a 'cationic lens', that is a silicone hydrogel contact lens comprising a polymeric lens body formed from a polymerizable composition having the acyclic tertiary amine monomer present, the amount of uptake by the polymeric lens body containing the acyclic tertiary amine monomer would be higher than the control lens using the same concentration of releasable anionic agent in a loading solution. Similarly, with the facilitating of a sustained release, the polymeric lens body containing the acyclic tertiary amine monomer in the polymerizable composition would have a longer release period, such as 8 hours or 9 hours compared to the control lens, and/or would have a more linear release profile over a period of 8 hours or 9 hours compared to the control lens. As used herein, the term "release profile" refers to the shape of the line when the amount of anionic agent released from the lens using the release media and release assay method described in Example 2 below is plotted at the 1 hr, 3 hr, 6 hr, and 9 hr time points, such as shown in FIG. 1A.

In one example, the cationic contact lens exhibits substantially linear release of the anionic agent for at least 8 hours. As used herein, substantially linear release for at least 8 hours is demonstrated if linear regression of the anionic agent release profile has an R-squared value of at least 0.90, with release amounts measured at 1 hr, 3 hr, 6 hr, and 9 hr time points (n=3 at each time point). In one example, the cationic contact lens exhibits substantially linear release of the anionic agent for at least 8 hours and has an R-squared value of at least 0.90. In some examples the cationic contact lens exhibits substantially linear release of the anionic agent for at least 8 hours and has an R-squared value of at least 0.90, and the control lens exhibits burst release with 50 wt. % or more of the anionic agent that is releasable from the contact lens is released in a period of 3 hours or less.

In some examples, the cationic contact lens of the present invention can have a release of the anionic agent of from 2 µg to 50 µg (such as from 5 µg to 50 µg, or from 10 µg to 40 µg, or from 10 µg to 30 µg) of anionic agent per hour for a period of at least 8 hours, at least 9 hours, or at least 10 hours, such as a period of from 8 hours to 16 hours or from 10 hours to 16 hours, or from 12 hours to 16 hours.

With the present invention, preferably a burst release of the anionic agent is avoided. An example of a burst release (or burst effect) is where 50 wt. % or more of the anionic agent that is releasable from the contact lens is released in a period of 3 hours or less.

Thus, with the present invention, the contact lens of the present invention is capable of providing at least one or more of the following properties: a) a substantially linear release profile of an anionic agent, b) the ability to upload large amounts of an anionic agent (at least 50 µg, or at least 100 µg, or at least 150 µg, or at least 200 µm to the lens), c) a release of an anionic agent over long periods of time (at least 8 hours, such as from 8 hours to 16 hours, or 9 hours to 16 hours, or 10 hours to 16 hours, or 8 hours to 12 hours), and/or d) avoid any burst release.

The uptake or loading of the releasable anionic agent by the silicone hydrogel contact lens can occur during an extraction step and/or during a hydration step and/or during the packaging step. For instance, the uptake of the releasable anionic agent can occur during the solvent extraction step after the contact lens material is cured and/or during one or more hydration steps, where the at least one releasable anionic agent is present in the extraction solvent and/or the hydration solution. Generally, if the anionic agent is not soluble in water it is added to an organic extraction solvent, such as ethanol or a mixture of ethanol and water. After curing, the polymeric lens body is swelled in the extraction solvent containing the anionic agent. When the extracted polymeric lens body is placed in a hydration solution, such as deionized water, the extraction solvent is removed and the anionic agent remains within the hydrated polymeric lens body. Generally, if the anionic agent is hydrophilic, it is included in the hydration solution or in the final packaging solution from which the anionic agent is taken up by the polymeric lens body.

For instance, the extraction and hydration liquids used in an extraction and hydration process can consist of denatured ethanol, a 50/50 (by vol) mixture of denatured ethanol and deionized water, and deionized water. As an example. the extraction and hydration process can involve at least one extraction step in denatured ethanol followed by a 50:50 mixture of ethanol water followed by at least one hydration step in deionized water, and wherein each extraction and hydration step can last from about 15 minutes to about 3 hours at a temperature of from about 20° C. and to about 30° C. For purposes of the present invention, any one or more or all of the liquids used for extraction and/or hydration can further contain one or more releasable anionic agents to achieve uploading of the releasable anionic agent to the polymeric lens body. To more effectively achieve the uploading, the liquid(s) can be adjusted to have a pH of 7 or lower, such as from about 4 to about 6.

In one example, the cationic silicone hydrogel contact lens contains at least 25% (by wt) more of the releasable anionic agent than a control lens, such as at least 50% more, or at least 75% more.

As described further below, an unworn contact lens after an extraction and hydration step is generally placed in a base member that contains a packaging solution and then the base member with contact lens and packaging solution is sealed and subjected to a sterilization process (e.g., autoclaving). As an option, the packaging solution can contain an amount of the releasable anionic agent so that this agent is uploaded to the contact lens upon packaging. Preferably, the sterilization step does not affect the uploading nor the stability of the agent in the contact lens or in the packaging solution.

As an option, eye drops and/or a multi-purpose contact lens care solution (MPS) can contain the releasable anionic agent. This option is particularly effective to recharge the contact lens with further releasable anionic agent. Thus, a further aspect of the present invention is the ability to recharge the contact lens with an uploading solution that contains the releasable anionic agent.

Any liquid used as an uploading solution for the releasable anionic agent can contain a concentration of releasable anionic agent of at least 50 ppm releasable anionic agent. This concentration can be at least 100 ppm, at least 250 ppm, at least 500 ppm, at least 750 ppm, at least 1000 ppm, at least 1250 ppm, at least 1500 ppm, at least 1750 ppm, or at least 2000 ppm of anionic agent. For instance, the concentration can be from 50 ppm to 2000 ppm or more of anionic agent in an uploading solution (or a solution used for uploading of the anionic agent to the contact lens).

In some examples, the releasable anionic agent, once adhered to the polymeric lens body is stable and does not substantially release from the polymeric lens body or degrade during autoclaving of the sealed contact lens package that contains the unworn silicone hydrogel contact lens in a packaging solution, or during storage in its packaging solution, but does release during lens wear. Thus, the packaging solution that the contact lens is immersed in, before autoclaving, or immediately after autoclaving, or after 1 day thereafter, or after 30 days thereafter, or after 60 days thereafter, or after 120 days thereafter has less than 10 ppm releasable anionic agent released into the packaging solution from the contact lens or less than 5 ppm or less than 1 ppm or 0 ppm released from the contact lens into the packaging solution. Whether the releasable anionic agent is released from a contact lens during autoclave or storage can be determined by testing for the presence of the releasable anionic agent in the packaging solution using HPLC, LCMS or other suitable analytical method.

With the present invention, one of the features that can be achieved, is to improve the comfort level of a soft contact lens, which includes reducing corneal sensitivity by releasing agents that block TRPV1 receptors or interact with PPARa receptors on the cornea.

Furthermore, the present invention relates to a method of making the sealed contact lens package of the present invention or the unworn sterile silicone hydrogel contact lens that includes a polymeric lens body. The method includes the steps of a) polymerizing a polymerizable composition (as described herein) in a contact lens mold to obtain a hydrogel contact lens, b) removing the hydrogel contact lens from the contact lens mold, c) extracting and hydrating the removed hydrogel contact lens one or more times, d) sealing said hydrated silicone hydrogel contact lens with packaging solution in a package, and e) autoclaving said package.

A silicone hydrogel material that is molded into the shape of a contact lens can be typically formed by curing a polymerizable composition (i.e. a monomer mixture) comprising the at least one siloxane monomer, the at least one hydrophilic monomer, and the at least one tertiary amine monomer, and optionally at least one hydrophobic monomer.

Conventional methods can be used to manufacture the contact lens of the invention. As an example, a polymerizable silicone hydrogel composition is dispensed into a female mold member having a concave surface that defines the front surface of the contact lens. A male mold member having a convex surface that defines the back surface of the contact lens, i.e. the cornea-contacting surface, is combined with the female mold member to form a contact lens mold assembly that is subjected to curing conditions, such as UV or thermal curing conditions, under which the curable composition is formed into a polymeric lens body. The female and male mold members can be non-polar molds or polar molds. The mold assembly is disassembled (i.e. demolded) and the polymeric lens body is removed from the mold and contacted with a solvent, for instance, an organic solvent, such as ethanol, to extract unreacted components from the lens body. After extraction, the lens body is hydrated in a hydration liquid such as water or an aqueous solution. As indicated, the releasable anionic agent may be included in one or more extraction solvent used for the extraction step, in one or more hydration liquid used for the hydration step, or in both an extraction solvent and a hydration liquid.

If a releasable anionic agent is included in the extraction solvent, the hydration step will displace the solvent with the hydration liquid, thereby hydrating the polymeric lens body to form a silicone hydrogel, and the releasable anionic agent (or portion thereof) can remain through ionic interaction within the resulting silicone hydrogel. Exemplary methods of manufacturing silicone hydrogel contact lenses are described in U.S. Pat. No. 8,865,789.

The contact lens in the present invention can be considered a soft contact lens, and particularly a soft silicone hydrogel contact lens. The contact lens sealed in the contact lens package of the present disclosure may be of any lens wear modality. Lens wear modality refers to the how many days and nights in a row the lens can be worn without removal. In one example, the contact lens sealed in the contact lens package of the present disclosure is a daily disposable lens. Daily disposable lenses are indicated for single use, up to about 12 or 16 hours of continuous wear and should be discarded after the single use. In another example, the contact lens sealed in the contact lens package of the present disclosure is a daily wear lens. Daily wear lenses are worn during the waking hours, typically up to about 12 to 16 hours, and are removed before sleep. Daily wear lenses are typically stored in a contact lens case containing a contact lens care solution for cleaning and disinfecting the lens during the hours of non-use. Daily wear lenses are typically discarded after a maximum of 30 days wear. In yet another example, the contact lens is an extended wear lens. Extended wear lenses are typically worn continuously for up to 6, 14 or 30 consecutive days and nights.

The packaging solution sealed within the contact lens package of the present disclosure may be any conventional contact-lens compatible solution. In one example, the packaging solution comprises, consists, or consists essentially, of an aqueous solution of a buffer, and/or a tonicity agent. In another example, the packaging solution contains additional agents such as one or more additional antimicrobial agents, and/or a comfort agent, and/or a hydrophilic polymer, and/or a surfactant and/or other additive that prevents the lens from sticking to the package. The packaging solution can have a pH in the range of about 6.8 or 7.0 up to about 7.8 or 8.0. In one example, the packaging solution comprises phosphate buffer or borate buffer. In another example, the packaging solution comprises a tonicity agent selected from sodium chloride or sorbitol in an amount to maintain osmolality in the range of about 200 to 400 mOsm/kg, and typically from about 270 mOsm/kg up to about 310 mOsm/kg. In some examples, the packaging solution may comprise polysaccharides (e.g. hyaluronic acid, hydroxypropyl methylcellulose, hydroxypropyl cellulose, hydroxyethyl cellulose, etc.) or other high molecular weight polymers, such as polyvinyl pyrrolidone, which are commonly used as comfort polymers or thickening agents in ophthalmic solutions and contact lens packaging solutions.

With respect to the contact lens package, this package can include or comprise a base member, such as a plastic base member, comprising a cavity configured to retain the contact lens and packaging solution and a flange region extending outwardly around the cavity. A removable foil or seal is attached to the flange region to provide a sealed contact lens package. Such contact lens packages, which are commonly referred to as "blister packs", are well-known in the art (see e.g. U.S. Pat. No. 7,426,993).

It will be appreciated that conventional manufacturing methods can be used to manufacture the sealed contact lens package. Thus, in one aspect of the present disclosure is a method of manufacturing a contact lens package including the step of placing an unworn contact lens and a contact lens packaging solution in a receptacle, placing a cover on the receptacle, and sealing the cover on the receptacle. Generally, the receptacle is configured to receive a single contact lens and an amount of packaging solution sufficient to completely cover the contact lens, typically about 0.5-1.5 ml. The receptacle may be made from any suitable material, such as glass or plastic. In one example, the receptacle comprises a plastic base member comprising a cavity configured to retain the contact lens and packaging solution and a flange region extending outwardly around the cavity, and the cover comprises a removable foil attached to the flange region to provide the sealed contact lens package. The removable foil may be sealed by any conventional means such as heat sealing or gluing. In another example, the receptacle is in the form of a plastic base member comprising a plurality of threads and the cover comprises a plastic cap member comprising a compatible set of thread for engagement with the threads of the base member thereby providing a resealable cover. It will be appreciated that other types of packaging can also be used to provide a resealable package. For example, the contact lens package may comprise a plastic cover comprising features that engage with compatible features of the receptacle to form an interference fit.

The method of manufacturing the sealed contact lens package may further comprise sterilizing the unworn contact lens by autoclaving the sealed contact lens package. Autoclaving generally involves subjecting the sealed contact lens package to temperatures of at least 121° C. for at least 20 minutes. The final product is a sterile, packaged silicone hydrogel contact lens having ophthalmically-acceptable surface wettability. In a specific example, the invention provides a contact lens package, comprising a base member having a cavity for accommodating a packaging solution and a contact lens; an unworn silicone hydrogel contact lens in the cavity of the base member; and a packaging solution in the cavity of the base member.

The following Examples illustrate certain aspects and advantages of the present invention, which should be understood not to be limited thereby.

Example 1. Oleic Acid Uptake from a Cationic Silicone Hydrogel Lens

Silicone hydrogel contact lenses were prepared using the polymerizable composition for stenfilcon A (control lenses) or stenfilcon A modified to contain about 4.5 wt. % 2-(dimethylamino)ethyl methacrylate (cationic lenses). The polymerizable compositions were cured in polypropylene contact lens molds. The polymeric lens bodies were removed from the molds and extracted by immersing them for 215 minutes in ethanol (EtOH) containing oleic acid (Sigma) in the concentrations shown in Table I. The lenses were removed from the EtOH and washed in a mixture of 50/50 EtOH/water for approximately 30 minutes followed by three exchanges of DI water for approximately 6 minutes, 30 minutes, and 30 minutes, respectively.

The amount of oleic acid (OA) in each lens (n=3) was determined by extracting the lens with isopropanol (IPA) and measuring oleic acid in the extract by liquid chromatography-mass spectrometry (LCMS). Briefly, each lens was removed from its container, lightly blotted to remove excess packaging solution, and placed in a 20 mL glass vial containing 10 mL 100% isopropanol (IPA). The vials were placed on a bench top shaker at 300 rpm overnight (~16 hours) at room temperature. For stenfilcon A, a single overnight extraction step is sufficient to extract substantially all the oleic acid from the lense. Silicone hydrogel lens materials that are more hydrophobic may require a second overnight extraction in order to extract all the oleic acid, in which case the IPA from the first extraction step is removed and replaced with 3 mL fresh IPA and shaken overnight at 300 rpm at room temperature. The amount of oleic acid in the IPA extract from each lens is determined by liquid chromatography-mass spectrometry (LCMS). The oleic acid loading concentrations and average oleic acid uptake amount per lens are shown in Table 1.

TABLE 1

| Lens | OA loading concentration | Average amount of OA/lens |
|---|---|---|
| Control | 750 ppm | 59 µg |
| Test | 750 ppm | 106 µg |
| Control | 1500 ppm | 124 µg |
| test | 1500 ppm | 218 µg |

Example 2. Oleic Acid Release from a Cationic Silicone Hydrogel Lens

An artificial tear film (ATF) having the composition shown in Table 2 was used as an in vitro release media.

TABLE 2

| Component | Concentration (mg/L) |
|---|---|
| Sodium chloride | 5259.8 |
| Potassium chloride | 1192.8 |
| Sodium citrate | 441.09 |
| Glucose | 36.032 |
| Urea | 72.072 |
| Calcium chloride | 55.49 |
| Sodium carbonate | 1271.88 |
| Potassium hydrogen carbonate | 300.33 |
| Sodium phosphate dibasic | 3407.04 |
| Bovine Serum Albumin (fatty Acid-free) | 2000 |
| Lysozyme from chicken egg white | 1900 |
| Mucin from bovine submaxillary glands | 150 |

TABLE 2-continued

| Component | Concentration (mg/L) |
|---|---|
| DI Water | 1 L |
| Hydrochloric acid (10 molar, 37%) | pH 7.1-7.2 |

Figure 1B:
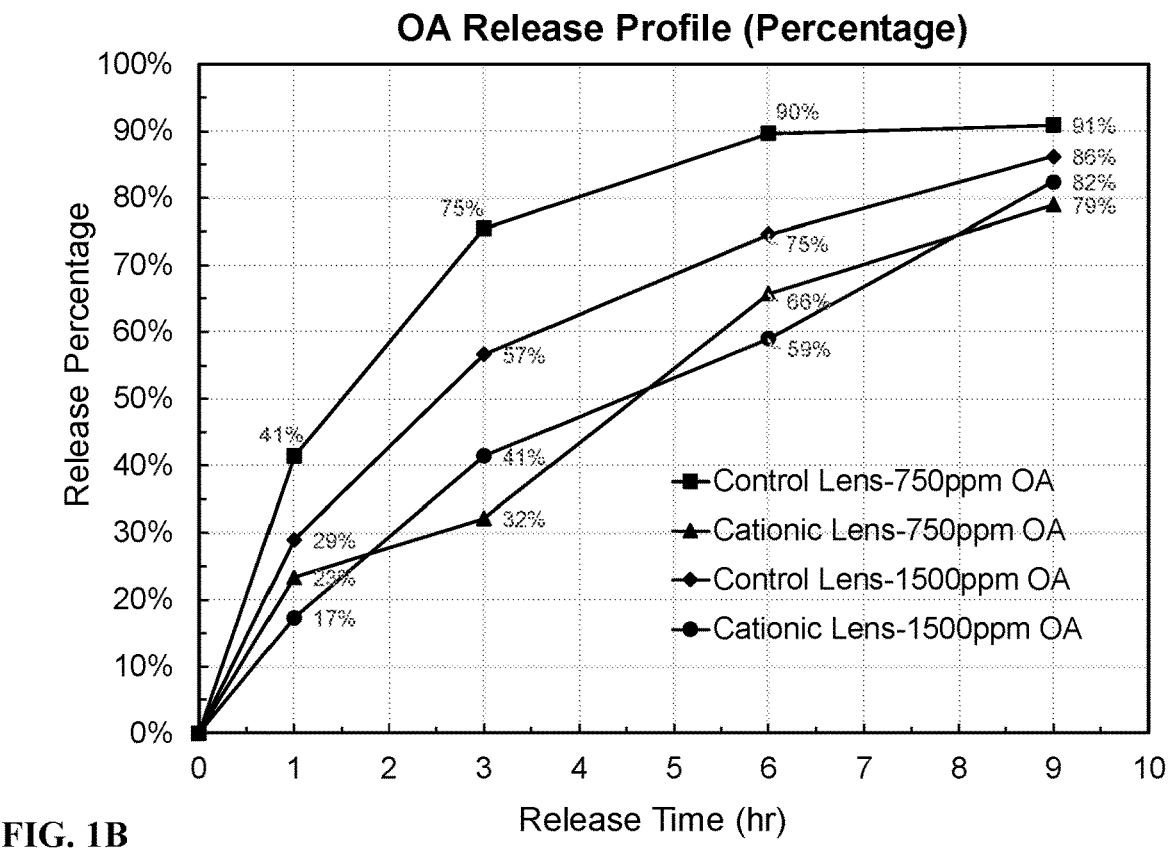
FIG. 1B plots the percentage of an anionic agent released from cationic silicone hydrogel contact lenses compared to a control lens.

Each lens was removed from its container and shaken to remove excess packaging solution. Each lens (n=3) was transferred to a 6 mL glass vial and 5 mL of ATS pre-warmed to 35° C. was added to each vial. The vials were placed in a 35° C. incubator and shaken at 125 rpm. The release media was exchanged with 4.5 mL fresh ATS at 1, 3, and 7 hours. The amount of oleic acid in the lens at each time point was determined using the IPA extraction method described in Example 1. The results are shown in Table 3 and plotted in FIG. 1A and FIG. 1B.

TABLE 3

| Time Point | Control Lens 750 ppm OA | | Cationic Lens 750 ppm OA | | Control Lens 1500 ppm OA | | Cationic Lens 1500 ppm OA | |
|---|---|---|---|---|---|---|---|---|
| | released (µg) | % release | released (µg) | % release | released (µg) | % release | released (µg) | % release |
| 1 hr | 24 | 41% | 25 | 23% | 36 | 29% | 38 | 17% |
| 3 hr | 45 | 75% | 34 | 32% | 70 | 57% | 90 | 41% |
| 6 hr | 53 | 90% | 70 | 66% | 92 | 75% | 128 | 59% |
| 9 hr | 54 | 91% | 84 | 79% | 107 | 86% | 180 | 82% |

Linear regression equations and R-squared values of the release profiles are provided in Table 4.

TABLE 4

| | Linear Regression Equation | R-squared Value |
|---|---|---|
| Control Lens 750 ppm OA | y = 5.3149x + 14.895 | $R^2 = 0.7392$ |
| Cationic Lens 750 ppm OA | y = 8.9659x + 8.3311 | $R^2 = 0.9542$ |
| Control Lens 1500 ppm OA | y = 10.999x + 19.296 | $R^2 = 0.88$ |
| Cationic Lens 1500 ppm OA | y = 18.949x + 15.164 | $R^2 = 0.9699$ |

Example 3. Dimensionally Stable Cationic Silicone Hydrogel Lens

Silicone hydrogel contact lenses were prepared using the polymerizable composition for stenfilcon A modified to contain 3-(dimethylamino)propyl methacrylate (DMAPMA) at about 1.0 wt. %, 1.5 wt. %, 2.0 wt. % and 2.5 wt. %. The compositions were used to prepare contact lenses using the method described in Example 1, except that oleic acid was not included in the extraction solvent. The dimensional stability of the lenses was determined using the shelf-life testing method described above (i.e. storage at 55° C. for three months to approximate a two-year shelf life at 25°). The average chord diameter of the lenses changed less than 1.0% from the original average chord diameter demonstrating that the lenses made with DMAPMA monomer are dimensionally stable.

The present invention includes the following numbered aspects/embodiments/features in any order and/or in any combination:

1. An unworn sterile silicone hydrogel contact lens immersed in a packaging solution and sealed in a package, said contact lens comprising:

a. a polymeric lens body that is the reaction product of a polymerizable composition comprising from 15 wt. % to 65 wt. % of at least one siloxane monomer, from 25 wt. % to 75 wt. % of at least one nonionic hydrophilic monomer, and from 0.5 wt. % to 3 wt. % of 3-(dimethylamino)propyl methacrylate; and b. at least one releasable anionic agent adhered to the polymeric lens body, wherein the 3-(dimethylamino) propyl methacrylate advantageously facilitates uptake and/or sustained release of the at least one releasable anionic agent by the polymeric lens body.

2. The contact lens of any preceding or following embodiment/feature/aspect, wherein the polymerizable composition comprises from 1.0 wt. % to 2.5 wt. % of 3-(dimethylamino)propyl methacrylate.

3. The contact lens of any preceding or following embodiment/feature/aspect, wherein the polymerizable composition comprises from 1.5 wt. % to 2.0 wt. % of 3-(dimethylamino)propyl methacrylate.

4. The contact lens of any preceding or following embodiment/feature/aspect, wherein the polymerizable composition comprises a first siloxane monomer represented by Formula I and a second siloxane monomer represented by Formula II.

5. The contact lens of any preceding or following embodiment/feature/aspect that is dimensionally-stable.

6. The contact lens of any preceding or following embodiment/feature/aspect, wherein the at least one releasable anionic agent is a fatty acid.

7. The contact lens of any preceding or following embodiment/feature/aspect, wherein the at least one releasable anionic agent is a small molecule.

8. The contact lens of any preceding or following embodiment/feature/aspect, wherein sustained release of the at least one releasable anionic agent by the polymeric lens body is substantially linear for at least 8 hours when placed in an artificial tear film solution.

9. The contact lens of any preceding or following embodiment/feature/aspect, wherein sustained release of the at least one releasable anionic agent by the polymeric lens body is substantially linear for at least 8 hours when placed in an artificial tear film solution, and wherein linear regression of the release profile has an R-squared value of at least 0.90.

10. The contact lens of any preceding or following embodiment/feature/aspect, wherein sustained release of the at least one releasable anionic agent by the polymeric lens body is substantially linear for at least 8 hours when placed in an artificial tear film solution, wherein linear regression of the release profile has an R-squared value of at least 0.90, and wherein a release profile of a control lens exhibits burst release with 50 wt. % or more of the anionic agent that is releasable from the control lens is released in a period of 3 hours or less.

11. The contact lens of any preceding or following embodiment/feature/aspect, wherein sustained release of the at least one releasable anionic agent by the polymeric lens body is substantially linear for at least 8 hours when placed in an artificial tear film solution, wherein linear regression of the release profile has an R-squared value of at least 0.90, wherein a release profile of a control lens exhibits burst release with 50 wt. % or more of the anionic agent that is releasable from the contact lens is released in a period of 3 hours or less, and wherein the releasable anionic agent is oleic acid.

12. The contact lens of any preceding or following embodiment/feature/aspect, wherein the packaging solution comprises an additional releasable anionic agent that is the same or different from said at least one releasable anionic agent.

13. The contact lens of any preceding or following embodiment/feature/aspect, wherein from about 25 µg to about 1000 µg of the releasable anionic agent is adhered to the polymeric lens body.

14. The contact lens of any preceding or following embodiment/feature/aspect, wherein from about 100 µg to about 300 µg of the releasable anionic agent is adhered to the polymeric lens body, and wherein the releasable anionic agent is oleic acid.

15. The contact lens of any preceding or following embodiment/feature/aspect, wherein the package comprises:

c. a base member having a cavity that retains the packaging solution; and d. a cover that forms a liquid-tight seal with the base member.

16. A silicone hydrogel contact lens comprising a polymeric lens body that is the reaction product of a polymerizable composition comprising from 25 wt. % to 55 wt. % of a siloxane monomer, from 30 wt. % to 55 wt. % of a vinyl monomer selected from N-vinyl pyrrolidone, N-vinyl-N-methyl acetamide, or combinations thereof, from 0.5 wt. % to 3 wt. % of 3-(dimethylamino)propyl methacrylate, and optionally from about 1 wt. % to about 20 wt. % of a hydrophilic monomer selected from N,N-dimethylacrylamide (DMA), 2-hydroxyethyl methacrylate (HEMA), ethoxyethyl methacrylamide (EOEMA), or ethylene glycol methyl ether methacrylate (EGMA), or any combination thereof, and optionally from about 1 wt. % to about 20 wt. % of a hydrophobic monomer selected from methyl methacrylate (MMA), isobornyl methacrylate (IBM), or 2-hydroxybutyl methacrylate (HOB) or any combination thereof.

17. A method of making the silicone hydrogel contact lens of any preceding or following embodiment/feature/aspect, said method comprising a) polymerizing said polymerizable composition in a contact lens mold to obtain the polymeric lens body, b) removing the polymeric lens body from said contact lens mold, c) extracting the polymeric lens body in an extraction solvent, d) hydrating the polymeric lens body in a hydration liquid to obtain the silicone hydrogel contact lens, e) sealing said silicone hydrogel contact lens with packaging solution in a package, and e) autoclaving said package, wherein at least one of the extraction solvent, or the hydration liquid, or the packaging solution contains the at least one releasable anionic agent.

18. The method of any preceding or following embodiment/feature/aspect, wherein the extraction solvent includes said at least one releasable anionic agent.

19. An unworn sterile silicone hydrogel contact lens comprising a polymeric lens body that is the reaction product of a polymerizable composition comprising from 15 wt. % to 65 wt. % of at least one siloxane monomer, from 25 wt. % to 75 wt. % of at least one nonionic hydrophilic monomer, and from 0.5 wt. % to 3 wt. % of 3-(dimethylamino)propyl methacrylate, and said unworn sterile silicone hydrogel contact lens is capable of substantially linear release of a releasable anionic agent at a release rate of at least 6 µg/hr for at least 8 hours when tested in an in vitro release assay, wherein the 3-(dimethylamino)propyl methacrylate advantageously facilitates uptake and/or sustained release of the releasable anionic agent by the polymeric lens body.

The disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

References herein to "an example" or "a specific example" or "an aspect" or "an embodiment" or similar phrase, are intended to introduce a feature or features of the cationic silicone hydrogel contact lens or components thereof, the sealed contact lens package or components thereof, or method of manufacturing the cationic silicone hydrogel contact lens (depending on context) that can be combined with any combination of previously-described or subsequently-described examples, aspects, embodiments (i.e. features), unless a particular combination of features is mutually exclusive, or if context indicates otherwise. Further, as used in this specification, the singular forms "a," "an," and "the" include plural referents (e.g. at least one or more) unless the context clearly dictates otherwise. Thus, for example, reference to a "contact lens" includes a single lens as well as two or more of the same or different lenses.

The entire contents of all cited references in this disclosure, to the extent that they are not inconsistent with the present disclosure, are incorporated herein by reference.

The present invention can include any combination of the various features or embodiments described above and/or in the claims below as set forth in sentences and/or paragraphs. Any combination of disclosed features herein is considered part of the present invention and no limitation is intended with respect to combinable features.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What we claim is:

1. An unworn sterile silicone hydrogel contact lens immersed in a packaging solution and sealed in a package, said contact lens comprising:
   (a) a polymeric lens body that is the reaction product of a polymerizable composition comprising from 15 wt. % to 65 wt. % of at least one siloxane monomer, from 25 wt. % to 75 wt. % of at least one nonionic hydrophilic monomer, and from 0.5 wt. % to 3 wt. % of 3-(dimethylamino)propyl methacrylate; and
   (b) at least one releasable anionic agent adhered to the polymeric lens body, wherein the 3-(dimethylamino) propyl methacrylate facilitates uptake and/or sustained release of the at least one releasable anionic agent by the polymeric lens body.

2. The contact lens of claim 1, wherein the polymerizable composition comprises from 1.0 wt. % to 2.5 wt. % of 3-(dimethylamino)propyl-methacrylate.

3. The contact lens of claim 1, wherein the polymerizable composition comprises a first siloxane monomer represented by Formula I and a second siloxane monomer represented by Formula II.

4. The contact lens of claim 3 that is dimensionally stable.

5. The contact lens of claim 1, wherein the at least one releasable anionic agent is a fatty acid.

6. The contact lens of claim 1, wherein the at least one releasable anionic agent is a small molecule.

7. The contact lens of claim 1, wherein sustained release of the at least one releasable anionic agent by the polymeric lens body is substantially linear for at least 8 hours when placed in an artificial tear film solution.

8. The contact lens of claim 1, wherein sustained release of the at least one releasable anionic agent by the polymeric lens body is substantially linear for at least 8 hours when placed in an artificial tear film solution, and wherein linear regression of the release profile has an R-squared value of at least 0.90.

9. The contact lens of claim 1, wherein sustained release of the at least one releasable anionic agent by the polymeric lens body is substantially linear for at least 8 hours when placed in an artificial tear film solution, wherein linear regression of the release profile has an R-squared value of at least 0.90, and wherein a release profile of a control lens exhibits burst release with 50 wt. % or more of the anionic agent that is releasable from the control lens is released in a period of 3 hours or less.

10. The contact lens of claim 1, wherein sustained release of the at least one releasable anionic agent by the polymeric lens body is substantially linear for at least 8 hours when placed in an artificial tear film solution, wherein linear regression of the release profile has an R-squared value of at least 0.90, wherein a release profile of a control lens exhibits burst release with 50 wt. % or more of the anionic agent that is releasable from the contact lens is released in a period of 3 hours or less, and wherein the releasable anionic agent is oleic acid.

11. The contact lens of claim 1, wherein the packaging solution comprises an additional releasable anionic agent that is the same or different from said at least one releasable anionic agent.

12. The contact lens of claim 1, wherein from about 25 µg to about 1000 µg of the releasable anionic agent is adhered to the polymeric lens body.

13. The contact lens of claim 1, wherein from about 100 µg to about 300 µg of the releasable anionic agent is adhered to the polymeric lens body, and wherein the releasable anionic agent is oleic acid.

14. The contact lens of claim 1, wherein the package comprises:
   (a) a base member having a cavity that retains the packaging solution; and
   (b) a cover that forms a liquid-tight seal with the base member.

15. A method of making the silicone hydrogel contact lens of claim 1, said method comprising a) polymerizing said polymerizable composition in a contact lens mold to obtain the polymeric lens body, b) removing the polymeric lens body from said contact lens mold, c) extracting the polymeric lens body in an extraction solvent, d) hydrating the polymeric lens body in a hydration liquid to obtain the silicone hydrogel contact lens, e) sealing said silicone hydrogel contact lens with packaging solution in a package, and e) autoclaving said package, wherein at least one of the extraction solvent, or the hydration liquid, or the packaging solution contains the at least one releasable anionic agent.

16. The method of claim 15, wherein the extraction solvent includes said at least one releasable anionic agent.

17. A silicone hydrogel contact lens comprising a polymeric lens body that is the reaction product of a polymerizable composition comprising from 25 wt. % to 55 wt. % of a siloxane monomer, from 30 wt. % to 55 wt. % of a vinyl monomer selected from N-vinyl pyrrolidone, N-vinyl-N-methyl acetamide, or combinations thereof, from 0.5 wt. % to 3 wt. % of 3-(dimethylamino)propyl methacrylate, and optionally from about 1 wt. % to about 20 wt. % of a hydrophilic monomer selected from N,N-dimethylacrylamide (DMA), 2-hydroxyethyl methacrylate (HEMA), ethoxyethyl methacrylamide (EOEMA), or ethylene glycol methyl ether methacrylate (EGMA), or any combination thereof, and optionally from about 1 wt. % to about 20 wt. % of a hydrophobic monomer selected from methyl methacrylate (MMA), isobornyl methacrylate (IBM), or 2-hydroxybutyl methacrylate (HOB) or any combination thereof.

18. The contact lens of claim 17, wherein the polymerizable composition comprises from 1.0 wt. % to 2.5 wt. % of 3-(dimethylamino)propyl methacrylate.

19. The contact lens of claim 17, wherein the polymerizable composition comprises a first siloxane monomer represented by Formula I and a second siloxane monomer represented by Formula II.

20. The contact lens of claim 17 that is dimensionally stable.

21. An unworn sterile silicone hydrogel contact lens comprising a polymeric lens body that is the reaction product of a polymerizable composition comprising from 15 wt. % to 65 wt. % of at least one siloxane monomer, from 25 wt. % to 75 wt. % of at least one nonionic hydrophilic monomer, and from 0.5 wt. % to 3 wt. % of 3-(dimethylamino)propyl methacrylate at least one acyclic tertiary amine monomer, and said unworn sterile silicone hydrogel contact lens is capable of substantially linear release of a releasable anionic agent at a release rate of at least 6 µg/hr for at least 8 hours when tested in an in vitro release assay, wherein the 3-(dimethylamino)propyl methacrylate facilitates uptake and/or sustained release of the releasable anionic agent by the polymeric lens body.

* * * * *